United States Patent [19]

LeDuc et al.

[11] Patent Number: 5,355,404
[45] Date of Patent: Oct. 11, 1994

[54] METHOD OF CONTROLLING PARAMETER DOWNLOADING FROM A COMMUNICATION SWITCHING SYSTEM TO CUSTOMER STATIONS

[75] Inventors: Douglas E. LeDuc, Bolingbrook; Ravindranath Madhavan, Naperville, both of Ill.

[73] Assignee: AT&T Bell Laboratories, Murray Hill, N.J.

[21] Appl. No.: 84,679

[22] Filed: Jun. 29, 1993

[51] Int. Cl.⁵ .............................................. H04M 3/42
[52] U.S. Cl. ................................. 379/201; 370/110.1
[58] Field of Search ....................... 379/201; 370/110.1

[56] References Cited

U.S. PATENT DOCUMENTS

| | | | |
|---|---|---|---|
| 4,592,048 | 5/1986 | Beckner | 370/110.1 |
| 4,747,127 | 5/1988 | Hansen | 379/201 |
| 4,788,720 | 11/1988 | Brennan | 379/201 |
| 4,899,373 | 2/1990 | Lee | 379/201 |
| 4,928,306 | 5/1990 | Biswas | 379/201 |
| 4,991,199 | 2/1991 | Parekh | 379/201 |
| 5,201,045 | 4/1993 | Pflueger | 379/201 |
| 5,237,604 | 8/1993 | Ryan | 379/201 |

OTHER PUBLICATIONS

Bellcore document, "ISDN Parameter Downloading Generic Requirements", Dec. 1992.

Primary Examiner—James L. Dwyer
Assistant Examiner—Michael N. Lau
Attorney, Agent, or Firm—Ross T. Watland

[57] ABSTRACT

A method for use by a switching system in controlling the downloading of parameters to customer stations. The notification of stations due to a change in a configuration group is performed at a controlled rate and accordingly any reduction in call processing due to the parameter downloading of customer stations is limited. The controlled rate notification is performed in accordance with two lists that are maintained by the switching system and used to track the active/inactive status of customer stations and to order the notification of active stations and the status checking of inactive stations.

13 Claims, 9 Drawing Sheets

NOTIFICATION PROCESS

FIG. 5
NOTIFICATION PROCESS

FIG. 7
STATION INITIALIZATION

FIG. 8
STATION DOWNLOAD REQUEST

FIG. 9
STATION FAILURES

FIG. 10
CRAFT MAINTENANCE

METHOD OF CONTROLLING PARAMETER DOWNLOADING FROM A COMMUNICATION SWITCHING SYSTEM TO CUSTOMER STATIONS

TECHNICAL FIELD

This invention relates to telecommunications.

BACKGROUND AND PROBLEM

As stored program-controlled switching systems have evolved, a wide variety of useful features have been developed to extend the communication capabilities such systems provide. This development is expanded with the deployment of integrated service digital network (ISDN) switching systems which provide a separate, out-of-band signaling channel (the D-channel) between the switching system and ISDN customer stations.

When a customer orders ISDN service, the customer conveys to a telephone company representative the specific services desired, including bearer capabilities, supplementary services, etc. A significant part of this information is related to the assignment of the services, directory numbers, and call appearances to specific locations, e.g., buttons and lamps, on the ISDN stations. The customer may make these determinations by consulting a template and then verbally communicating which button is to activate each service and which lamp should be associated with each service. All of this information is then stored in the switching system database. In the past, it has been necessary to also manually enter into each customer station some of the information verbally provided to the representative. For the service to work properly, the station related information in the switching system must exactly match the information entered into the station.

To improve this process, a procedure known as ISDN parameter downloading has been proposed where the D-channel is used for downloading such station related information. With parameter downloading in place, the customer would communicate the desired service information to the telephone company representative as before. However, the customer stations would automatically request parameter downloading as part of their initialization procedure so that no additional manual steps would be required at the stations. When service profile changes occur in the switching system that require parameters to be downloaded again, the switching system notifies the customer stations to request a parameter download. Parameter downloading eliminates the time-consuming and error-prone manual steps at the customer stations.

A configuration group is a group of customer stations that are all identically configured, i.e., the buttons and lights are used in the same way for the same feature set. Corporate customers may each have one or more configuration groups that comprise hundreds or thousands of customer stations. The parameters for a particular configuration group are stored in a single storage location within the switching system for downloading to all customer stations of the group. When a change is made to a configuration group—adding the call forwarding feature, for example—a large number of stations are affected. Performing all the resulting notification and downloading in an uncontrolled fashion would unacceptably interfere with the switching system processing of telephone calls. The notification and downloading is further complicated because some of the stations may be in an inactive or out-of-service status at the time of the change to the configuration group.

Solution

These problems are solved and a technical advance is achieved in accordance with the principles of the invention in an exemplary method where the notification of stations due to a change in a configuration group is performed at a controlled rate and accordingly any reduction in call processing due to the parameter downloading of customer stations is limited. The controlled rate notification is performed in accordance with two lists, advantageously maintained by the switching system and used to track the active/inactive status of customer stations and to order the notification of active stations and the status checking of inactive stations.

DETAILED DESCRIPTION

Figure 1:
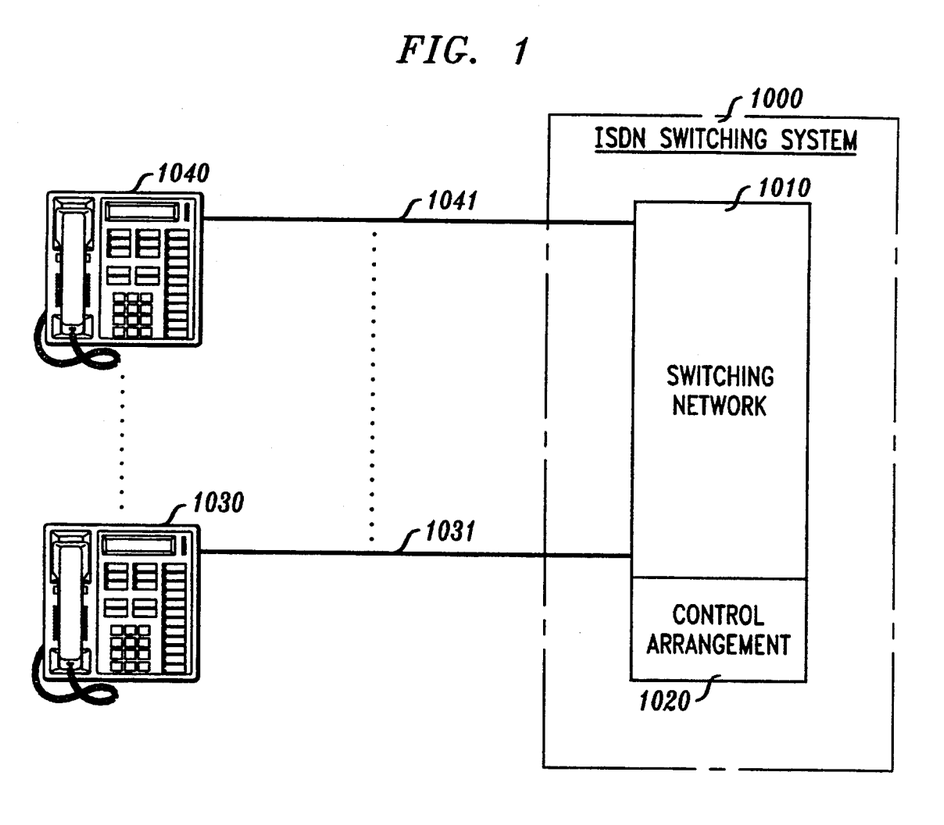
FIG. 1 is a diagram of an arrangement including a plurality of ISDN customer stations and an ISDN switching system where an exemplary method of the invention is performed.

The principles of the present invention are described in the context of an integrated services digital network (ISDN) switching system 1000 (FIG. 1). An integrated services digital network is defined as a network evolved from the telephony integrated digital network that provides end-to-end digital connectivity to support a wide range of services, including voice and non-voice services, to which users have access by a limited set of standard multipurpose customer interfaces. One example of ISDN switching system 1000 is the integrated packet switching and circuit switching system disclosed in U.S. Pat. No. 4,592,048, issued to M. W. Beckner et al. Switching system 1000 includes a switching network 1010, which represents, in the above-referenced exemplary integrated packet switching and circuit switching system, a plurality of time-slot interchange units and a time-multiplexed switch to provide circuit-switched connections, and a plurality of packet switching units (interconnected via the time-slot interchange units and time-multiplexed switch) to provide packet-switched connections. Switching system 1000 further includes control arrangement 1020 which represents the control portion of the above-referenced exemplary switching system, including a central control and a plurality of control units that intercommunicate via predetermined channels of the time-multiplexed switch and a control distribution unit.

Figure 2:
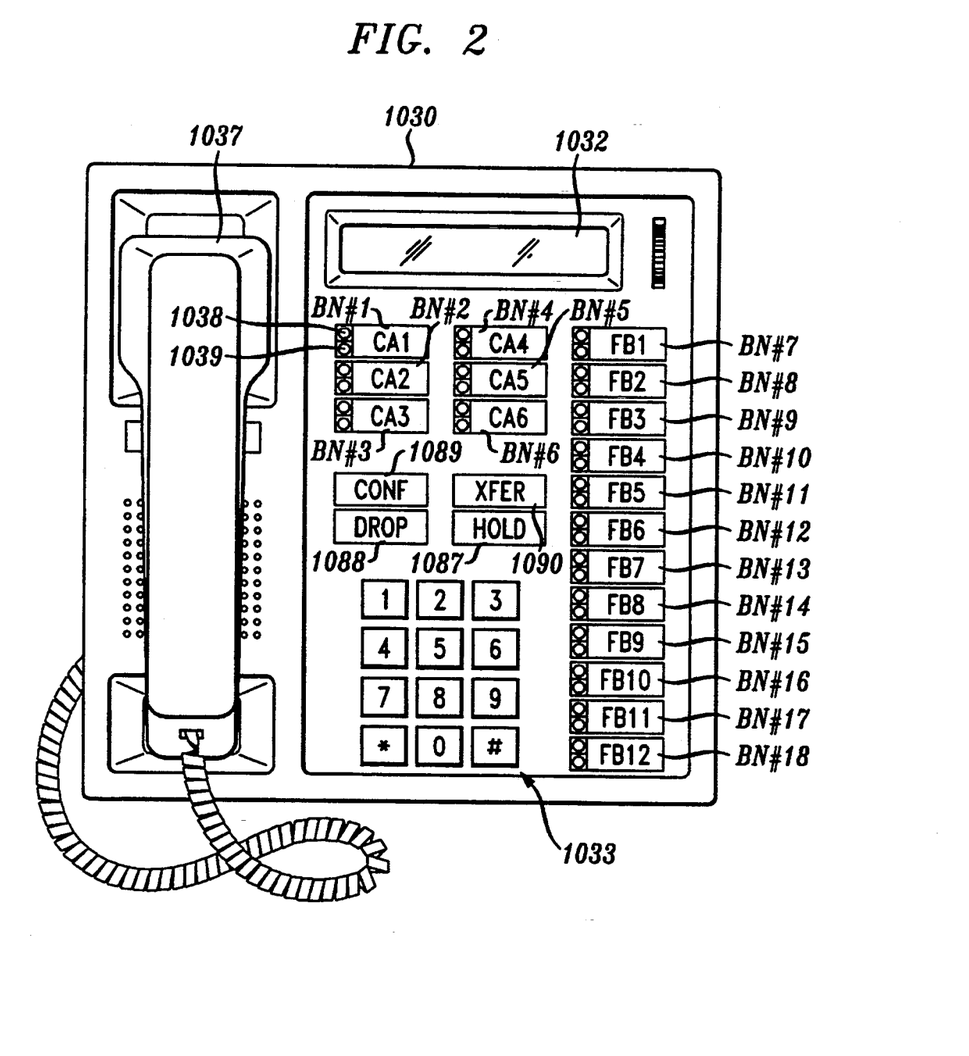
FIG. 2 is a detailed diagram of one of the customer stations of FIG. 1.

Also shown in FIG. 1 are two ISDN customer stations 1030 and 1040 which are connected to switching system 1000 via associated user access lines (digital subscriber lines) 1031 and 1041. Although only two such customer stations are explicitly shown, it is understood that switching system 1000 interconnects a larger plurality of ISDN customer stations and may interconnect conventional analog station sets as well. As shown in FIG. 2, ISDN customer station 1030 includes a handset 1037, a telephone keypad 1033 and a display 1032 for visually displaying messages. Customer station 1030 also includes 22 buttons BN#1 through BN#18 and 1087 through 1090. In accordance with the present example, buttons 1087 through 1090 are only used for the HOLD, DROP, CONFERENCE and TRANSFER functions. The remaining buttons happen to be configured at customer station 1030 such that buttons BN#1 through BN#6 are call appearances and buttons BN#7 through BN#18 are feature buttons. Significantly, the identical customer station could be configured to meet different user requirements such that buttons BN#1 and BN#2 are call appearances and buttons BN#3 through BN#6 and BN#7 through BN#18 are feature buttons or such that buttons BN#1 through BN#6 and BN#7 through BN#15 are feature buttons and buttons BN#16 through BN#18 are call appearances. Each call appearance or feature button has associated in-use and status lamps. For example, button BN#1 has associated in-use lamp 1038 and status lamp 1039. The in-use lamp is lit for a call appearance when that call appearance is the selected call appearance at the customer station. The status lamp is used to indicate the various stages of calls, e.g., alerting, active, etc., or to indicate the activation of feature buttons.

Each ISDN customer station, e.g., 1030, transmits information to and receives information from switching system 1000 (FIG. 1) on a digital subscriber line in two 64 kilobits per second channels referred to as B-channels and in one 16 kilobits per second channel referred to as a D-channel. In the present embodiment, one B-channel is used to convey digitized voice samples at the rate of 8000 eight-bit samples per second and the other B-channel is used to convey data at a rate of 64 kilobits per second. (However, each B-channel could be used for either voice or data traffic.) Each B-channel is separately circuit-switched by switching network 1010 to other station equipment (either ISDN or analog). The D-channel is used both to convey signaling packets to effect message signaling between ISDN customer stations and control arrangement 1020, and to convey data packets between different ISDN customer stations. The D-channel is packet-switched by switching network 10 10 either to other ISDN customer stations, or to control arrangement 1020 which controls the establishment of both circuit-switched calls and packet-switched calls within switching system 1000. While all customer stations connected to each digital subscriber line receive a 144 kb/s bandwidth, each customer station does not always require the entire bandwidth. To increase bandwidth usage and decrease outside-plant wiring costs, CCITT Recommendation I.430 allows connection of multiple customer stations to a single digital subscriber line in a point-to-multipoint configuration.

Figure 3:
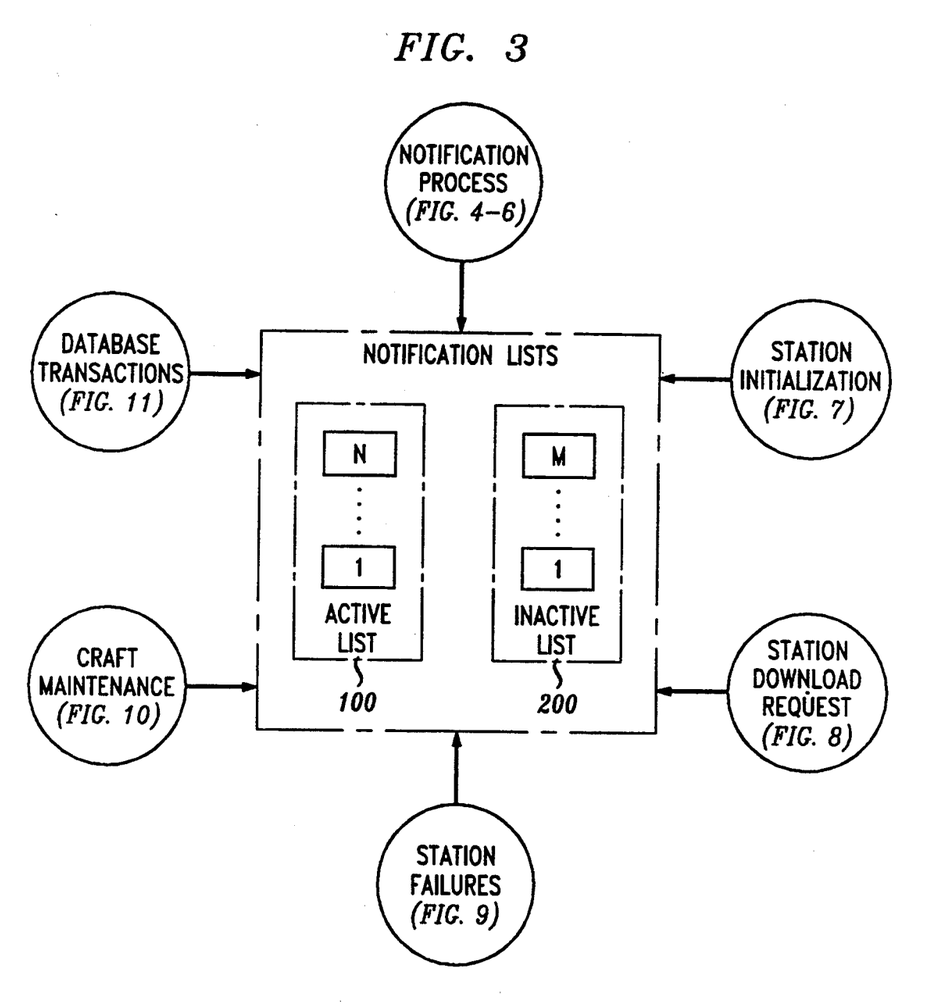
FIG. 3 is a diagram of two notification lists stored in the switching system of FIG. 1 and various processes that interact with the lists.

Parameter downloading of station related information concerning features, buttons and lamps, etc., is performed using the D-channels from switching system 1000 to customer stations. Parameter downloading occurs in response to download requests from customer stations that are either generated independently by the stations or generated by the stations in response to notifications from switching system 1000. FIG. 3 is a diagram of two notification lists—active list 100 with N customer station entries and inactive list 200 with M customer station entries—and various processes of switching system 1000 that interact with lists 100 and 200. Lists 100 and 200 are maintained by switching system 1000 and are used to track the active/inactive status of customer stations and to order the notification of active stations and the status checking of inactive stations. It is important to note that the processes of FIG. 3 run concurrently with other higher priority processes such as call processing. The lists 100 and 200 are stored in a memory (not shown) included in control arrangement 1020.

Figure 4:
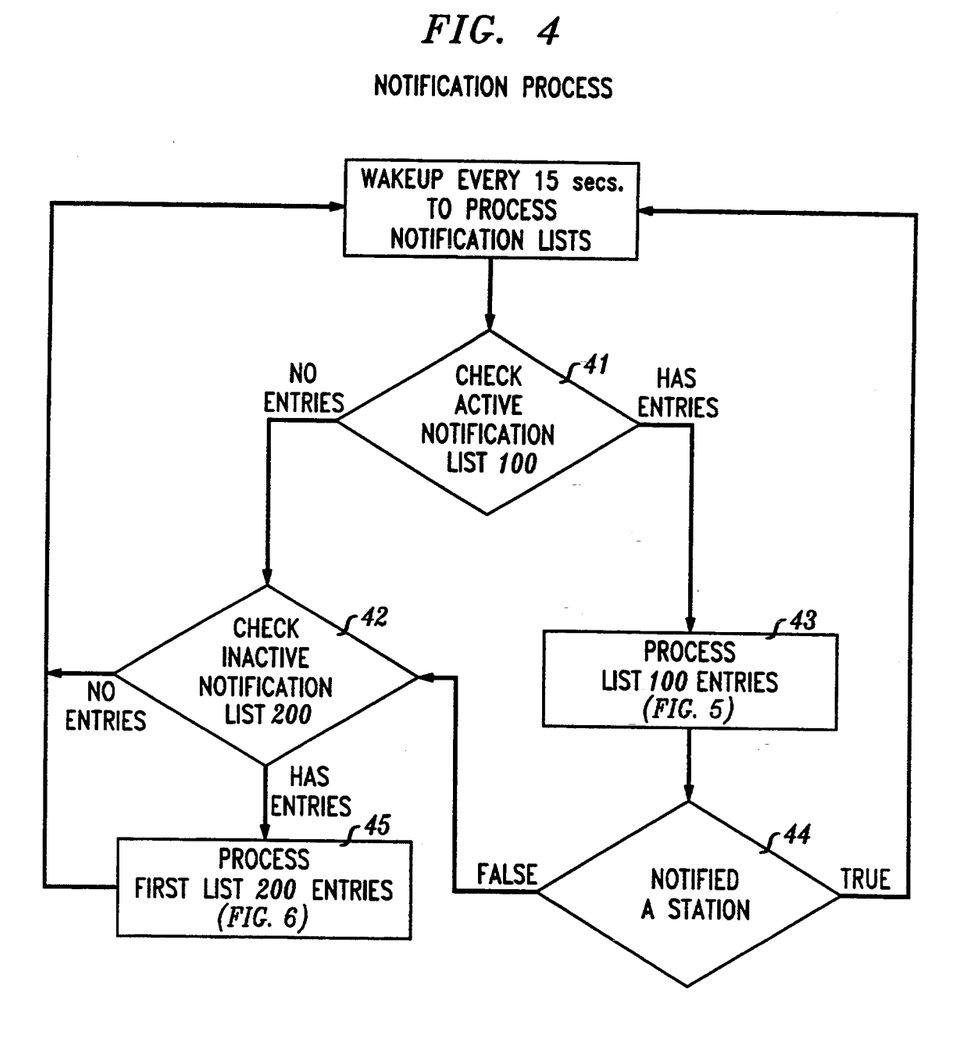
FIGS. 4–11 are flow chart diagrams of the processes of FIG. 3.
Figure 5:
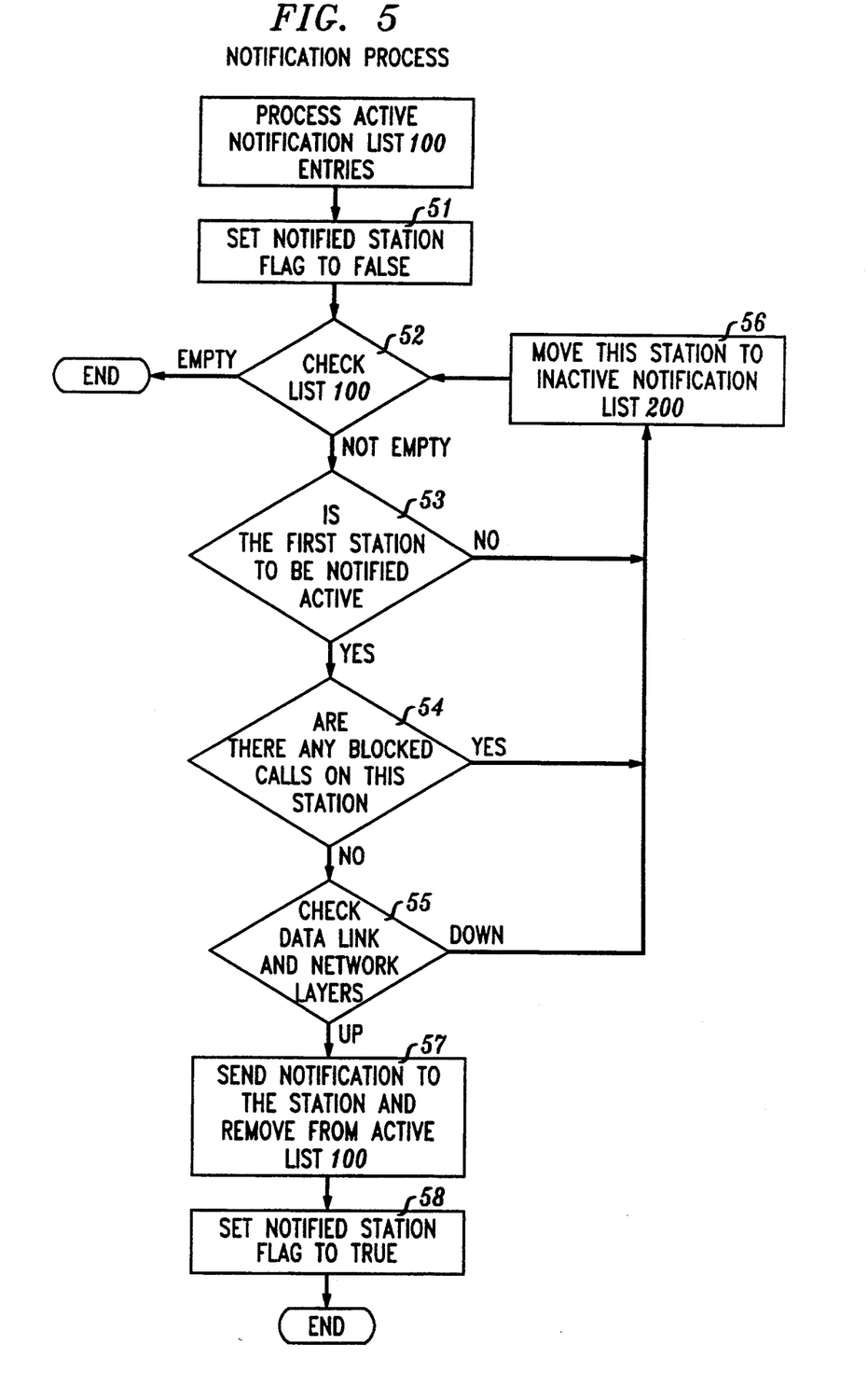
Figure 6:
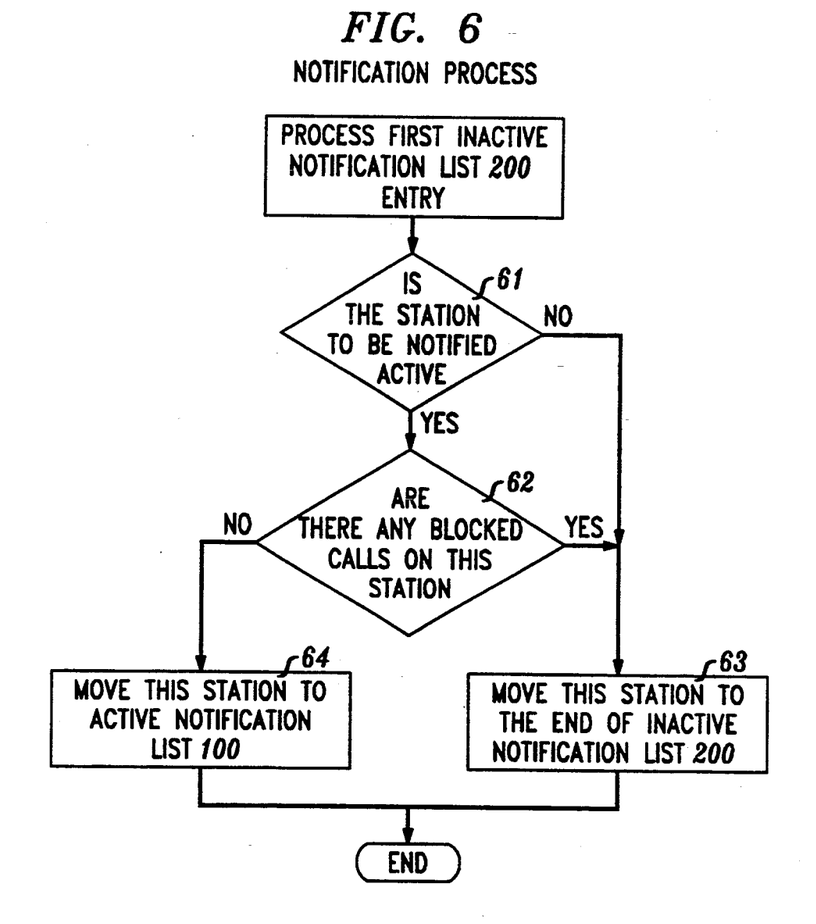

First consider the notification process of FIGS. 4–6. The process is performed at the controlled rate of once every 15 seconds. As a result of this rate, any reduction of call load capacity of switching system 1000 is limited to less than 5 per cent. Execution begins with block 41 where active list 100 is checked to determine whether any entries indicating active stations are listed. If list 100 has entries, execution proceeds to block 43 which is shown in detail in FIG. 5. The execution of block 43 results in the notification of at most one customer station. Execution proceeds to block 44 where it is determined whether a customer station was notified in block 43. If a station was notified, execution returns to the beginning to be repeated in accordance with the controlled rate. If a customer station was not notified in block 43, execution proceeds from block 44 to block 42. Further, if the check of list 100 in block 41 determined that list 1130 had no entries, execution proceeds from block 41 to block 42. In block 42, inactive list 200 is checked to determine whether it has any entries. If list 200 has entries, execution proceeds to block 45 which is shown in detail in FIG. 6. If either block 45 is completed or the check of block 42 indicates that list 200 has no entries, execution returns to the beginning to be repeated in accordance with the controlled rate.

Switching system 1000 stores data for each served customer station defining its active/inactive status and whether calls to the station are blocked due to a craft-initiated removal of the station from service. A customer station may be inactive because the station is unplugged, power is removed, the station is not initialized, or because of a failure of the physical, link, or network levels of communication between the customer station and switching system 1000.

Execution of block 43 (FIG. 4) begins with block 51 (FIG. 5) where a notified station flag is set to false. In block 52, list 100 is checked to determine whether it is empty. If it is empty, processing of block 43 (FIG. 4) is complete. If it is not empty, execution proceeds to block 53 (FIG. 5) and the first customer station on list 100 is checked to determine whether it is in an active status. If the station is not in an active status, it is moved from list 100 to list 200 in block 56 and execution returns to block 52. If the station is in an active status, execution proceeds to block 54 where it is determined whether any calls are blocked on the station. If a call is blocked, the station is moved from list 100 to list 200 in block 56 and execution returns to block 52. If no call is blocked, execution proceeds to block 55 where the data link and network layers are checked to determined whether they are up or down i.e., functioning or not functioning. If the network and/or the link levels are down, the station is moved from list 100 to list 200 in block 56 and execution returns to block 52. If both the network and link levels are up, execution proceeds to block 57 and switching system 1000 transmits a notify message to the station indicating that parameters are to be downloaded to the station. The downloading occurs only after the station transmits a download request to switching system 1000. Also in block 57, the station is removed from list 100 and in block 58 the notified terminal flag is set to true. The processing of block 43 (FIG. 4) is complete. It is advantageous to remove the station from list 100 in block 57, since it is desired to transmit a notify message to a station only once.

Execution of block 45 (FIG. 4) begins with block 61 (FIG. 6) where it is determined whether the first customer station in list 200 is now in an active status. If it is not, execution proceeds to block 63 where the station is moved to the end of list 200. If the station is in an active status, execution proceeds to block 62 where it is determined whether there are any blocked calls on the station. If there are, execution proceeds to block 63 where the station is moved to the end of list 200. After the execution of either blocks 63 or 64, the processing of block 45 (FIG. 4) is complete.

Figure 7:
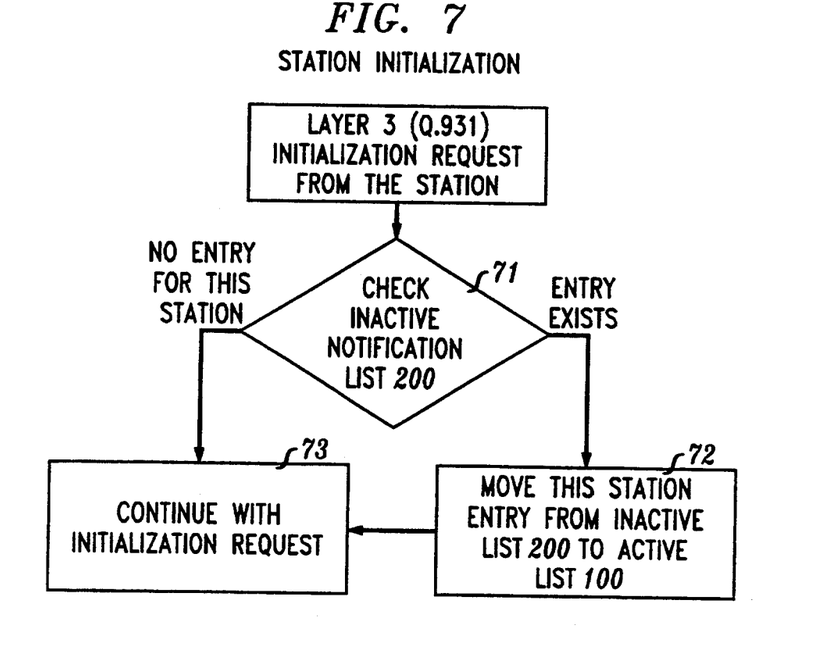

Switching system 1000 responds to each layer 3 (Q.931) initialization request from a customer station by executing block 71 (FIG. 7) to determine whether the customer station is on list 200. If there is no entry for the station on list 200, execution proceeds to block 73 and the processing of the initialization request is continued. If there is an entry for the station on list 200, execution proceeds to block 72 and the station is moved from list 200 to the end of list 100. Processing of the initialization request is then continued in block 73.

Figure 8:
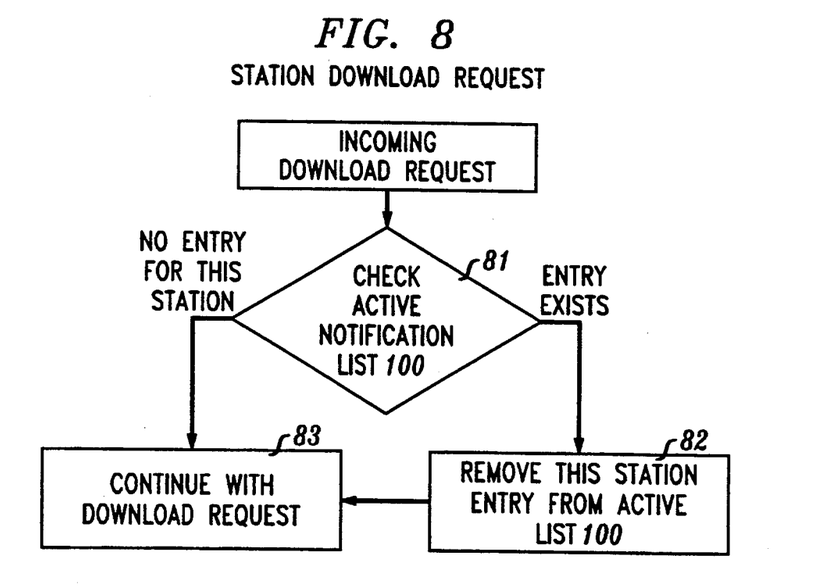

Switching system 1000 responds to each download request from a customer station by executing block 81 (FIG. 8) to determine whether the customer station is on list 100. If there is no entry for the station on list 100, execution proceeds to block 83. If there is an entry for the station on list 100, the entry is removed in block 82 and execution proceeds to block 83. In block 83, processing of the download request from the station continues and parameters are downloaded to the station.

Figure 9:
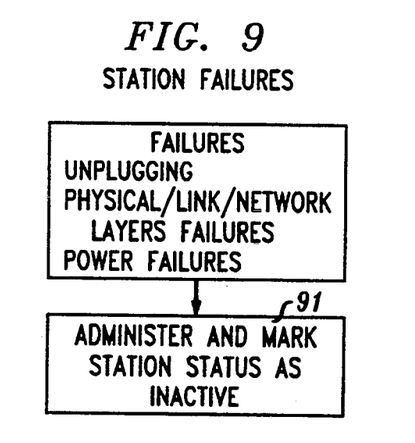

Switching system 1000 responds to any of a number of failures—unplugging the station, physical/link/network layer failures, or power failure—by executing block 91 (FIG. 9) where the station is administered and marked as having an inactive status.

Figure 10:
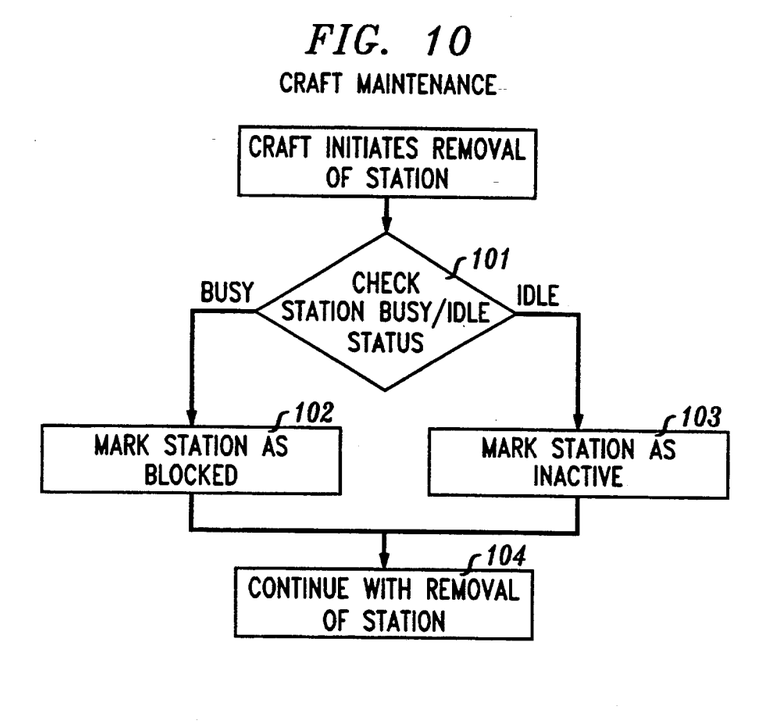

Switching system 1000 responds to a craft-initiated removal of a customer station from service by executing block 101 (FIG. 10) where the station busy/idle status is checked. If the station is busy, it is marked as blocked in block 102. If the station is idle, it is marked as inactive in block 103. The removal of the station continues in block 104.

Figure 11:
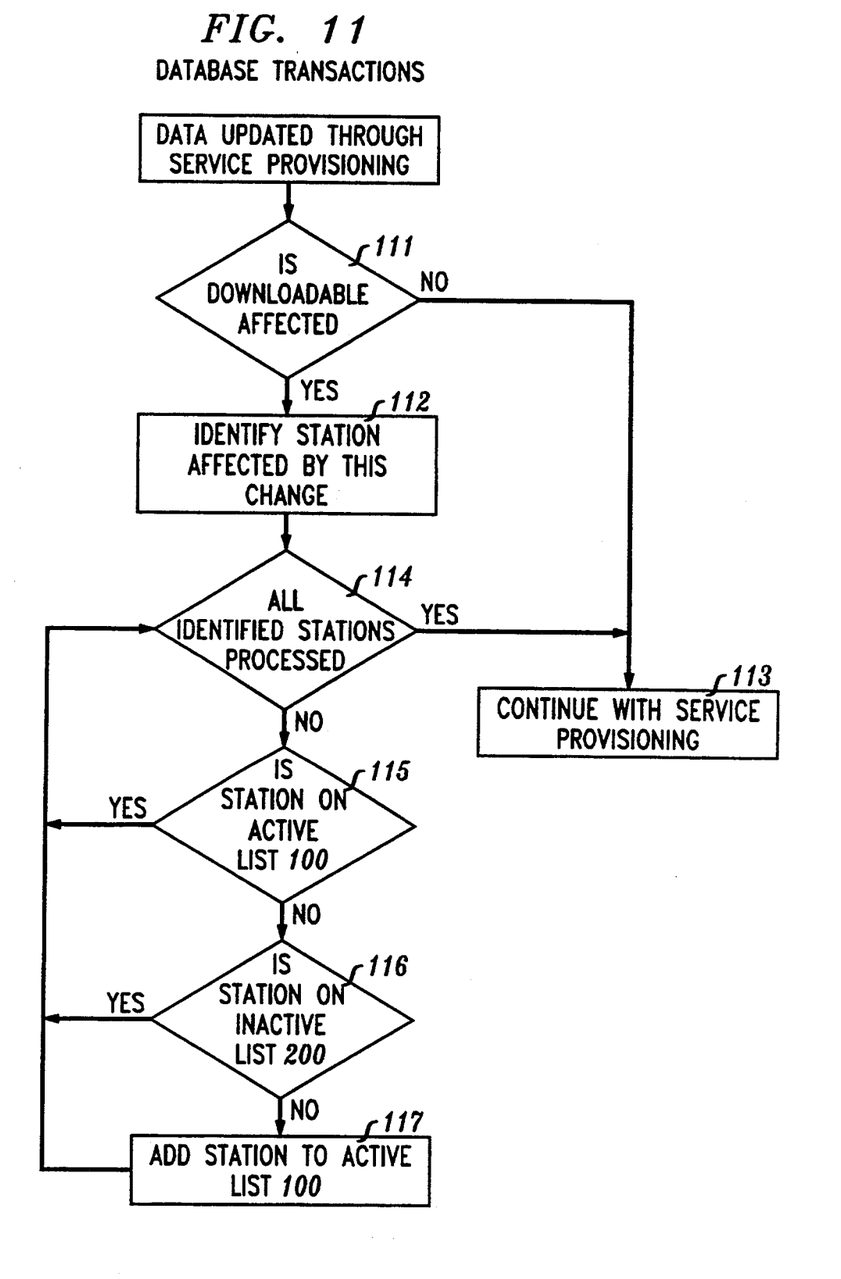

Whenever the parameters or data that are stored in switching system 1000 (relating, for example, to the configuration, directory numbers, or intercom features of customer stations) are changed, block 111 (FIG. 11) is performed and a determination is made as to whether the changed parameters are downloadable. If the parameters are not downloadable, execution proceeds to block 113 and service provisioning is continued. If the parameters are downloadable, execution proceeds to block 112 and all customer stations affected by the change are identified. For each identified station, execution proceeds via block 114 to block 115 where it is determined whether the identified station is on list 100. If it is on list 100, execution returns to block 114. If the station is not on list 100, execution proceeds to block 116 where it is determined whether the identified station is on list 200. If it is on list 200, execution returns to block 114. If the station is not on list 200, execution proceeds to block 117, the station is added to the end of list 100 and execution returns to block 114. In each case when execution is returned to block 114, execution proceeds to block 115 with the next station that was identified in block 112.

It is to be understood that the above-described embodiment is merely illustrative of the principles of the invention and that many variations may be devised by those skilled in the art without departing from the spirit and scope of the invention. For example, the stations could be analog display stations as specified in Bellcore TR-NWT-001273 issued December 1992, the switch could be a non-ISDN switch, and the switch/station communication be via frequency shift keying. It is therefore intended that such variations be included within the scope of the claims.

We claim:

1. A method for use by a switching system in controlling the downloading of parameters to customer stations, said method comprising
    maintaining a first list of customer stations to which parameters are to be downloaded from said switching system,
    maintaining a second list of customer stations to which parameters are to be downloaded from said switching system,
    A) determining whether a given customer station on said first list is in an active status,
    B) upon determining that said given customer station is in an active status, downloading parameters to said given customer station,
    C) upon determining that said given customer station is in an inactive status, moving said given customer station to said second list and
    D) repeating, for successive customer stations on said first list, step A) and, dependent on the status of each successive one of said customer stations, either step B) or step C) at a rate that is established such that any reduction of call load capacity of said switching system due to parameter downloading is within a predefined limit.

2. A method in accordance with claim 1 where step B) further comprises
    upon determining that said given customer station is in an active status, notifying said given customer station and performing said downloading only in response to a download request from said given customer station.

3. A method in accordance with claim 1 further comprising
    in response to a change of the parameters stored by said switching system, identifying customer stations that are affected by said change, determining whether each identified customer stations is absent from said first and second lists, and upon determining that said each identified customer station is absent from said first and second lists, adding said each identified customer station to said first list.

4. A method in accordance with claim 1 further comprising
    in response to an initialization request from a second customer station different from said given customer station, determining whether said second customer station is on said second list, and upon determining that said second customer station is on said second list, moving said second customer station to said first list.

5. A method in accordance with claim 1 further comprising
    in response to a download request from a second customer station different from said given customer station, downloading parameters to said second customer station, determining whether said second customer station is on said first list, and upon determining that said second customer station is on said first list, removing said second customer station from said first list.

6. A method in accordance with claim 1 further comprising in response to a failure associated with a second customer station different from said given customer station, changing said second customer station to an inactive status.

7. A method in accordance with claim 1 further comprising in response to a craft-initiated removal of a second customer station different from said given customer station from service, changing said second customer station to an inactive status.

8. A method for use by a communication switching system, said method comprising processing calls and concurrently with said processing and in response to a change to data stored by said switching system, determining a plurality of customer stations to which said data is to be downloaded, placing said plurality of customer stations on a first list, checking, at a controlled rate, each customer station on said first list to determine its active/inactive status and downloading said data to those of said customer stations which were checked and determined to be active, where said controlled rate limits any reduction in said processing by said switching system due to data downloading.

9. A method in accordance with claim 8 further comprising notifying checked customer stations, which were determined to be active, of said change and performing said downloading only in response to download requests from customer stations.

10. A method in accordance with claim 8 further comprising moving each checked customer station, which was determined to be inactive, to a second list, subsequently determining that a customer station on said second list has returned to active status and downloading said data to that active customer station.

11. A method in accordance with claim 8 further comprising moving each checked customer station, which was determined to be inactive, to a second list, subsequently determining that a customer station on said second list has returned to active status and moving that active station to said first list.

12. A method for use by a switching system in controlling the downloading of parameters to customer stations, said method comprising maintaining a first list of customer stations to be notified to request a download of parameters from said switching system, maintaining a second list of customer stations to be notified to request a download of parameters from said switching system, A) determining whether said first list is empty, B) upon determining that said first list is not empty, determining whether the first customer station on said first list is in an active status, upon determining that said first customer on said first list is in an active status, notifying said first customer station on said first list to request a download of parameters from said switching system, and upon determining that said first customer on said first list is in an inactive status, moving said first customer on said first list to the end of said second list, C) upon determining that said first list is empty, determining whether the first customer station on said second list is in an active status, upon determining that said first customer station on said second list is in an active status, moving said first customer station on said second list to said first list, and upon determining that said first customer station on said second list is in an inactive status, moving said first customer station on said second list to the end of said second list, and D) repeating steps A) through C) at a rate that is controlled such that any reduction of call load capacity of said switching system due to parameter downloading is limited.

13. A method in accordance with claim 12 further comprising in response to a change of the parameters stored by said switching system, identifying customer stations that are affected by said change, determining whether each identified customer station is absent from both of said first and second lists, and upon determining that said each identified customer station is absent from both of said first and second lists, adding said each identified customer station to the end of said first list.

* * * * *

UNITED STATES PATENT AND TRADEMARK OFFICE
CERTIFICATE OF CORRECTION

PATENT NO. : 5,355,404
DATED : October 11, 1994
INVENTOR(S) : Douglas E. LeDuc and Ravindranath Madhavan It is certified that error appears in the above-indentified patent and that said Letters Patent is hereby corrected as shown below:

Column 6, line 51, claim 3, delete "customer stations" and substititute "customer station".

Signed and Sealed this

Fourth Day of April, 1995

Attest:

BRUCE LEHMAN

Attesting Officer

Commissioner of Patents and Trademarks